United States Patent

Takehara et al.

[11] Patent Number: 6,031,736
[45] Date of Patent: *Feb. 29, 2000

[54] CONTROL APPARATUS OF INVERTER AND POWER GENERATION SYSTEM USING SUCH CONTROL APPARATUS

[75] Inventors: Nobuyoshi Takehara, Kyoto; Kimitoshi Fukae, Nara, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/685,934

[22] Filed: Jul. 22, 1996

[30] Foreign Application Priority Data

Jul. 26, 1995 [JP] Japan ................................. 7-209357

[51] Int. Cl.⁷ ............................. H02M 3/335; H02M 3/24
[52] U.S. Cl. ................................ 363/21; 363/98; 323/906
[58] Field of Search ................................ 363/17, 21, 132, 363/98; 323/906

[56] References Cited

U.S. PATENT DOCUMENTS

| | | | |
|---|---|---|---|
| 4,390,940 | 6/1983 | Corbefin et al. | 323/906 |
| 4,404,472 | 9/1983 | Steigerwald | 307/46 |
| 4,424,557 | 1/1984 | Steigerwald | 363/98 |
| 4,649,334 | 3/1987 | Nakajima | 323/906 |
| 4,697,136 | 9/1987 | Ishikawa | 323/906 |
| 4,750,102 | 6/1988 | Yamano et al. | 323/906 |
| 4,794,272 | 12/1988 | Bavaro et al. | 363/95 |
| 5,293,447 | 3/1994 | Fanney et al. | 323/906 |
| 5,604,430 | 2/1997 | Decker et al. | 323/906 |
| 5,654,883 | 8/1997 | Takehara et al. | 323/906 |

FOREIGN PATENT DOCUMENTS

| | | |
|---|---|---|
| 57-025171 | 2/1982 | Japan . |
| 62-085312 | 4/1987 | Japan . |
| 7-28537 | 1/1995 | Japan . |
| 8126344 | 5/1996 | Japan . |

OTHER PUBLICATIONS

"Usage of Power Device and Practical Control Circuit Design Method", pp. 92–103.
"Power Electronics", pp. 120–121.

Primary Examiner—Peter S. Wong
Assistant Examiner—Rajnikant B. Patel
Attorney, Agent, or Firm—Fitzpatrick, Cella, Harper & Scinto

[57] ABSTRACT

To provide a cheap inverter which uses a single digital microprocessor and can execute a current control and a maximum power control without changing a design of a hardware even for any switching device or solar cell, there is provided a control apparatus of an inverter for converting a DC electric power into an AC electric power by using a switching device, wherein the control apparatus is constructed by an inversion discrimination circuit for receiving an output current or an output voltage and a reference signal and for discriminating whether a switching state of the switching device should be inverted or not and a gate pulse signal forming unit for changing the switching state of the switching device in response to an inversion request signal which is outputted from the inversion discrimination circuit. The gate pulse signal forming unit has a CPU for forming a gate pulse signal by an interrupting process by using the inversion request signal as an interruption control signal.

7 Claims, 9 Drawing Sheets

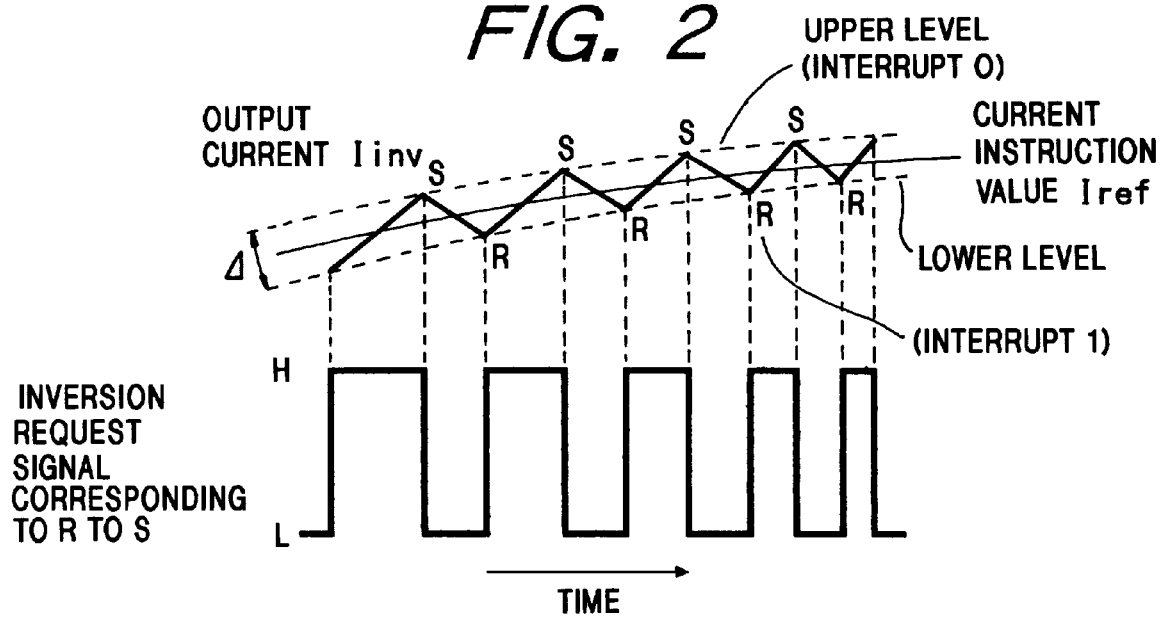
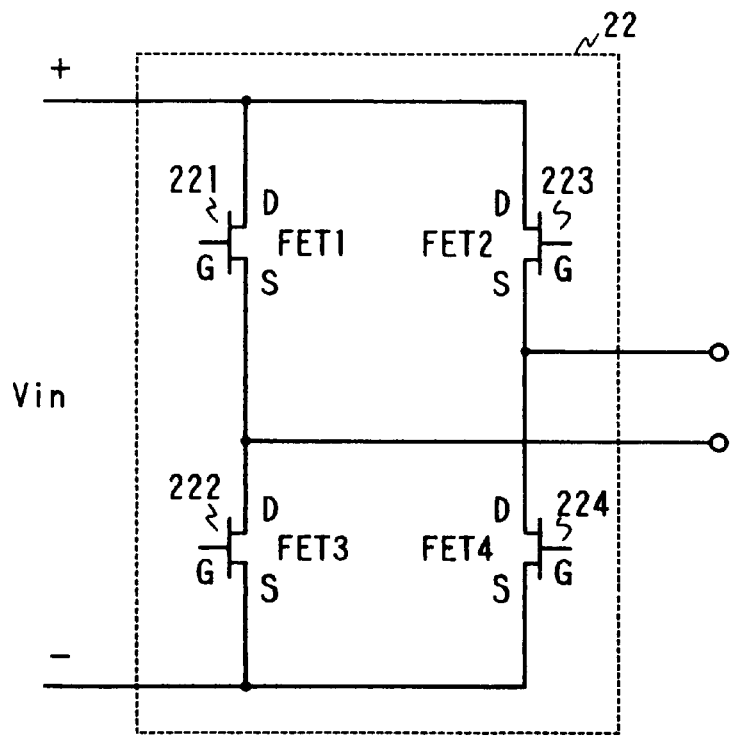

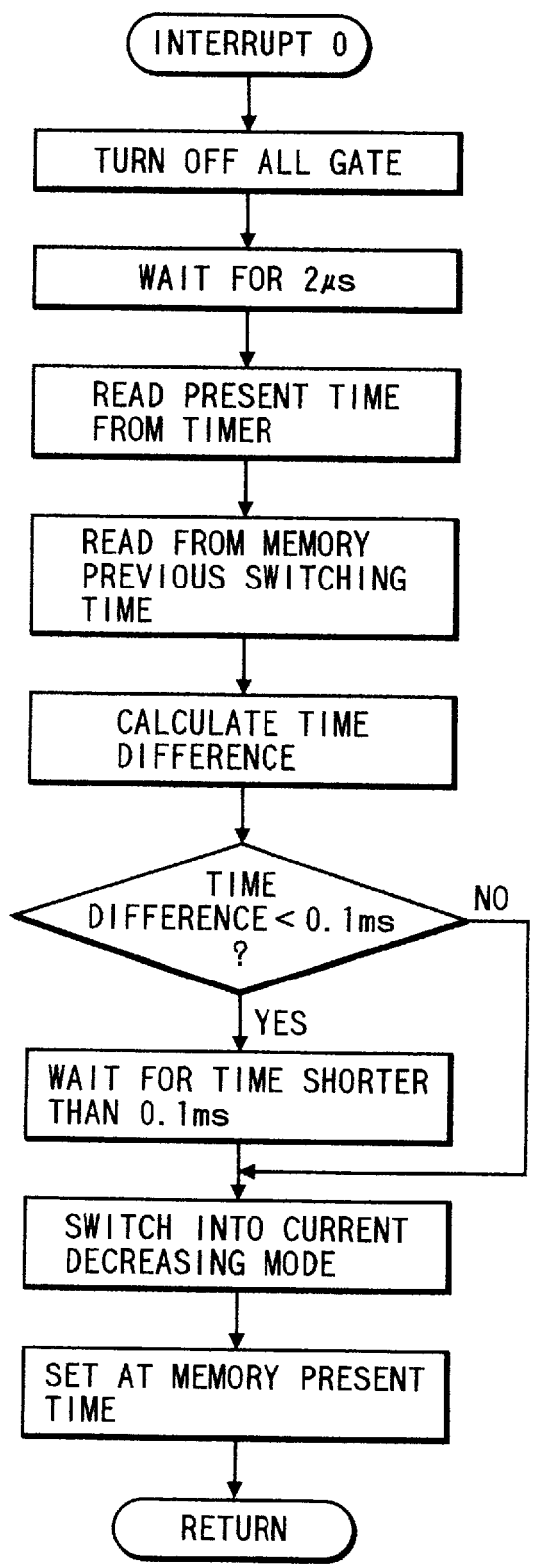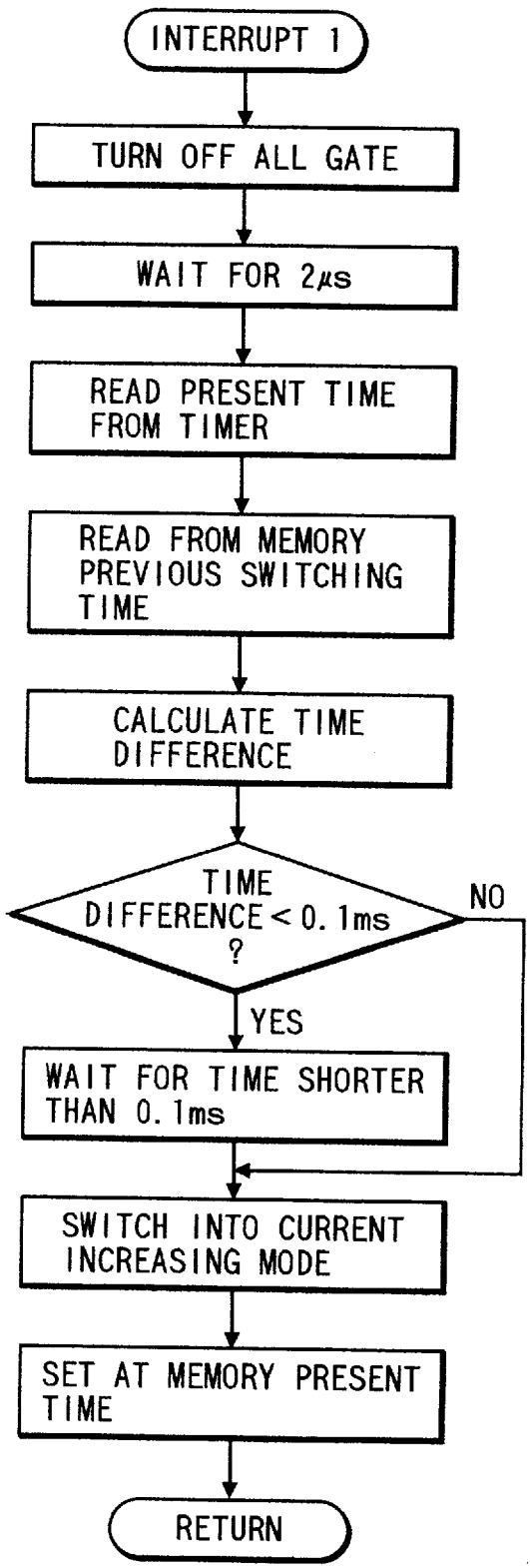

CONTROL APPARATUS OF INVERTER AND POWER GENERATION SYSTEM USING SUCH CONTROL APPARATUS

BACKGROUND OF THE INVENTION

1. Field of the Invention

The invention relates to a control apparatus of an inverter and a power generation system using such a control apparatus. More particularly, the invention relates to a control apparatus of a system linkage inverter which is linked to a commercially available power source system and a power generation system using such a control apparatus and capable of coping with an unstable power generation such as a solar power generation.

2. Related Background Art

A solar power generation system that converts an inexhaustible clean solar energy into an electric power is desirable. Particularly, in recent years, legal preparation is progressing and a system linkage system for converting a DC electric power which is generated by a solar cell into an AC power by using an inverter and for supplying the AC power to the commercially available power source system can be used on a full scale. FIG. 1 shows an example of a general solar power generation system. An output of a solar cell 1 is connected to a commercially available power source system 3 through a system linkage inverter (hereinafter, simply referred to as an inverter) 2. The inverter 2 has therein: an input filter (DC side filter) 21 having a coil and a capacitor; a switching unit 22 having a semiconductor switch which is on/off controlled by a gate control signal and the like; an output filter (AC side filter) 23 having a coil and a capacitor; and a control apparatus 24 for controlling the operation of an inverter. The control apparatus 24 has a maximum power control unit 241 and an instant value current control unit 242. The inverter 2 can also have a protecting apparatus and the like.

The maximum power control unit 241 changes an operation point of a solar cell in accordance with a change in insolation intensity or temperature, thereby extracting the maximum electric power from the solar cell. The control unit 241 inputs a solar cell voltage Vpv and a solar cell current Ipv and arithmetically operates an output current instruction value of the inverter so that a solar cell output becomes maximum. More particularly, the control unit 241 arithmetically operates and calculates a voltage such that the solar cell electric power becomes maximum and controls the current instruction value so that the solar cell voltage is equal to such a voltage. It is a general way to use a digital microprocessor (what is called a micom) as an arithmetic operating apparatus. As an example of such a maximum power control unit, there is a unit as disclosed in Japanese Patent Application Laid-open No. 62-85312.

The instant value current control unit 242 inputs the current instruction value from the maximum power control unit 241 and controls the switching unit 22 by a gate control signal so that an output current of the inverter almost coincides with the current instruction value. As an example of such an instant value current control unit, there is a unit as disclosed in U.S. Pat. No. 4,424,557.

An example of the operation of the instant value current control unit will now be described with reference to FIGS. 1 and 2. The instant value current control unit 242 inputs the current instruction value from the maximum power control unit 241 and sends a gate control signal (on/off) instruction signal to the switching unit 22. FIG. 2 shows relations among the gate signal, output current waveform, and current instruction value in this instance. As shown in FIG. 2, as for the instant value current control signal, a gate control signal is transmitted so that the output current almost coincides with the current instruction value. Namely, when the gate signal is at the high (H) level, the output current increases. When the output current exceeds the instruction value by a predetermined amount or more, the gate signal is set to the low (L) level, thereby reducing the output current. When the output current is lower than the instruction value by a predetermined amount or more, the gate signal is again set to the H level, thereby increasing the output current. By such a control operation, the output current is almost made coincide with the instruction value. In the inverter for solar power generation system, in order to reduce noises and an output current distortion, in many cases, the highest frequency of the gate signal is set to a fairly high value in a range from about 10 kHz to 30 kHz.

The maximum power control unit and instant value current control unit are ordinarily individually constructed. This is because control speeds which are required for the maximum power control and the instant value current control are quite different. Since it is sufficient that the maximum power control unit merely traces a fluctuation of the insolation, a control unit having a lower switching speed can be used. According to the study of the inventors et al., it is sufficient that the control unit can operate at a slow period such as 0.1 second. However, the instant value current control system continuously compares the output current with the current instruction value and must decide an on/off of the gate from the comparison result. Moreover, in order to reduce an output current distortion and noises, it is required to turn on/off the switching unit at a frequency of 10 kHz or higher. For example, in order to realize a switching speed of 10 kHz, it is necessary to suppress a control period to a value less than at most 100 microseconds. If both of the control operations are executed by one digital microprocessor, all of control logics can be assembled as a software, so that a flexibility of the system remarkably rises. However, if such a construction is ordinarily embodied, both of the maximum power control and the instant value current control are executed in the control period (for example, 100 μsec), so that an extremely high speed microprocessor and an extremely high speed analog/digital converter are necessary. They are very expensive and there is a problem such that the inverter cannot be cheaply constructed. Therefore, in general, the instant value current control unit constructed like a hardware and the maximum power control unit constructed like a software are combined as mentioned above. Although it is easy to perform the instant value current control by the hardware, since two control units of the hardware and the digital microprocessor are provided, the costs rise and an installing place is necessary. When a new switching device appears, it is necessary to change the design of the hardware of the current control unit.

An inverter control apparatus using an interruption by a timer has been disclosed in Japanese Patent Application Laid-open No. 57-25171. However, such an apparatus cannot be applied to an inverter having an input such that it successively changes in accordance with an insolation like a solar cell.

As mentioned above, a proper control apparatus suitable for a linkage inverter to perform the instant value current control (waveform formation control) and the maximum power control by using a single CPU is not yet realized.

SUMMARY OF THE INVENTION

The invention is made in consideration of the above problems and it is an object of the invention to provide a cheap inverter which uses a single digital microprocessor and which can execute a current control and a maximum power control without changing a design of a hardware even for any switching device or solar cell.

Another object of the invention is to provide a control apparatus of an inverter for converting a DC electric power into an AC electric power by using a switching device and for reversely supplying to a commercially available power source system, comprising: inversion discriminating means for comparing an output current or an output voltage of the inverter with a predetermined reference signal, thereby discriminating whether a switching state of the switching device is inverted or not; and gate pulse signal forming means for inverting the switching state of the switching device in response to an inversion request signal which is outputted from the discriminating means and, wherein the gate pulse signal forming means is constructed by a digital CPU, and the CPU receives the inversion request signal as an interruption control signal and forms a gate pulse signal to invert the switching state of the switching device in an inversion request interruption processing routine after the interruption control signal was inputted.

Still another object of the invention is to provide a power generation system comprising: an inverter having such a control apparatus; a solar cell for supplying a DC electric power to the inverter; and a commercially available power source system as an additional device of the inverter, wherein an output electric power of the solar cell is reversely supplied to the commercially available power source system.

To accomplish the above object, according to the invention, there is provided a control apparatus of an inverter for converting a DC electric power into an AC electric power by using a switching device, comprising: an inversion discrimination circuit for receiving an output current or an output voltage and a reference signal, thereby discriminating whether a switching state of the switching device should be inverted or not; and gate pulse signal forming means for changing the switching state of the switching device in response to an inversion request signal which is outputted from the inversion discrimination circuit and, wherein the gate pulse signal forming means is constructed by a CPU and inputs the inversion request signal as an interruption control signal of the CPU.

When considering the switching operation of the inverter, it will be understood that a period of time when some process is functionally necessary is nothing but a moment for switching the switch. In the invention, by paying attention to such a point, the moment for inverting is discriminated by a hardware manner and an interruption request signal is generated, thereby allowing the CPU to execute the switching operation of the switch only for such an instantaneous time. With this method, the CPU ordinarily can devote itself to a process such as protecting process, maximum power process, or the like such that it has a relatively enough response time and can execute a process to form a switching gate pulse by using an interrupting process in an extremely short response time. With this method, since the gate pulse forming process is described as a software of the CPU, even when the switching device is changed, there is no need to change the hardware. Further, an independence of mutual processing routines is remarkably raised and a debugging can be easily performed.

BRIEF DESCRIPTION OF THE DRAWINGS

FIG. 2 is a schematic explanatory diagram for explaining the relation between an output current value and a current instruction value;

FIG. 4 is a schematic-circuit diagram for explaining an example of a switching unit;

FIGS. 7A, 7B, 8A and 8B are flowcharts each for explaining an example of an interrupting process.

DETAILED DESCRIPTION OF THE PREFERRED EMBODIMENTS

Embodiment 1

Figure 3:
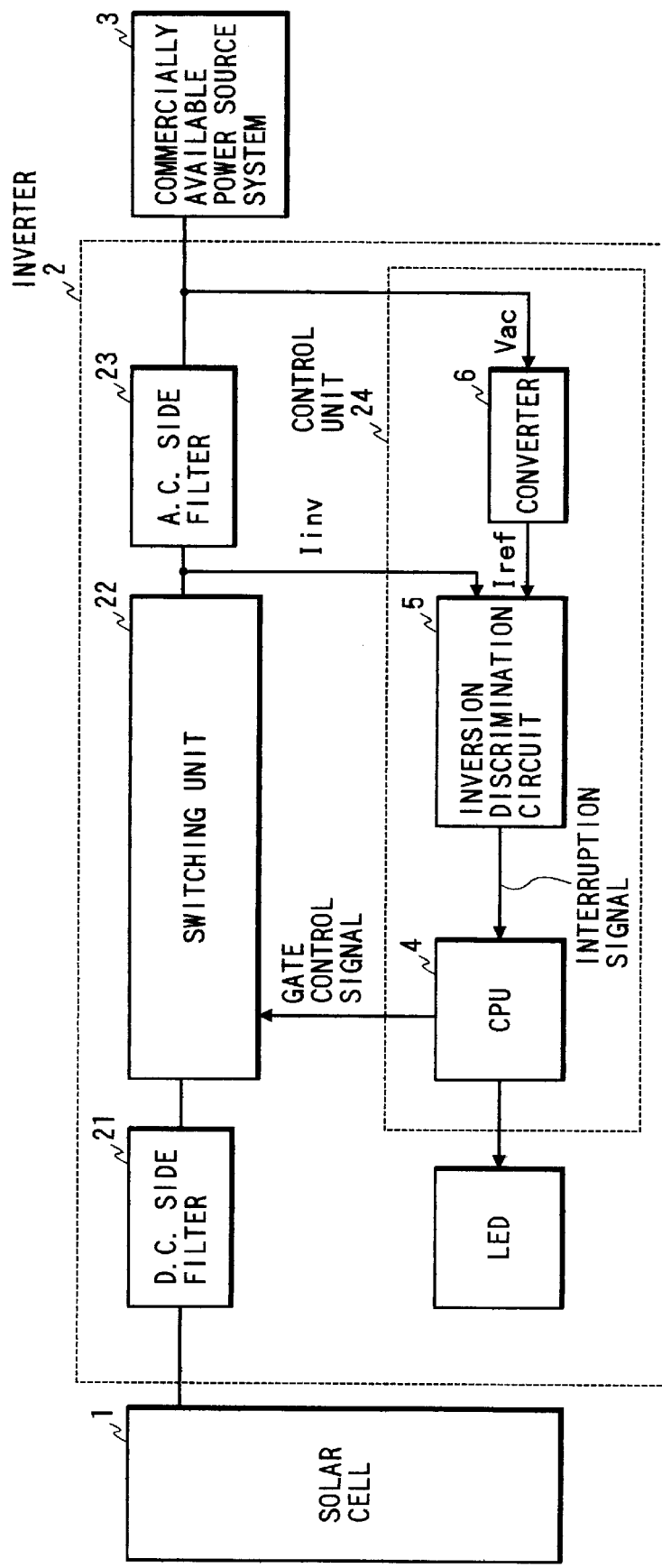
FIGS. 3 and 10 are schematic block constructional diagrams each for explaining one of an example of a construction of a solar power generation system of the invention.

FIG. 3 shows a preferred example of a construction of a solar power generation system using an inverter according to the invention.

Figure 1:
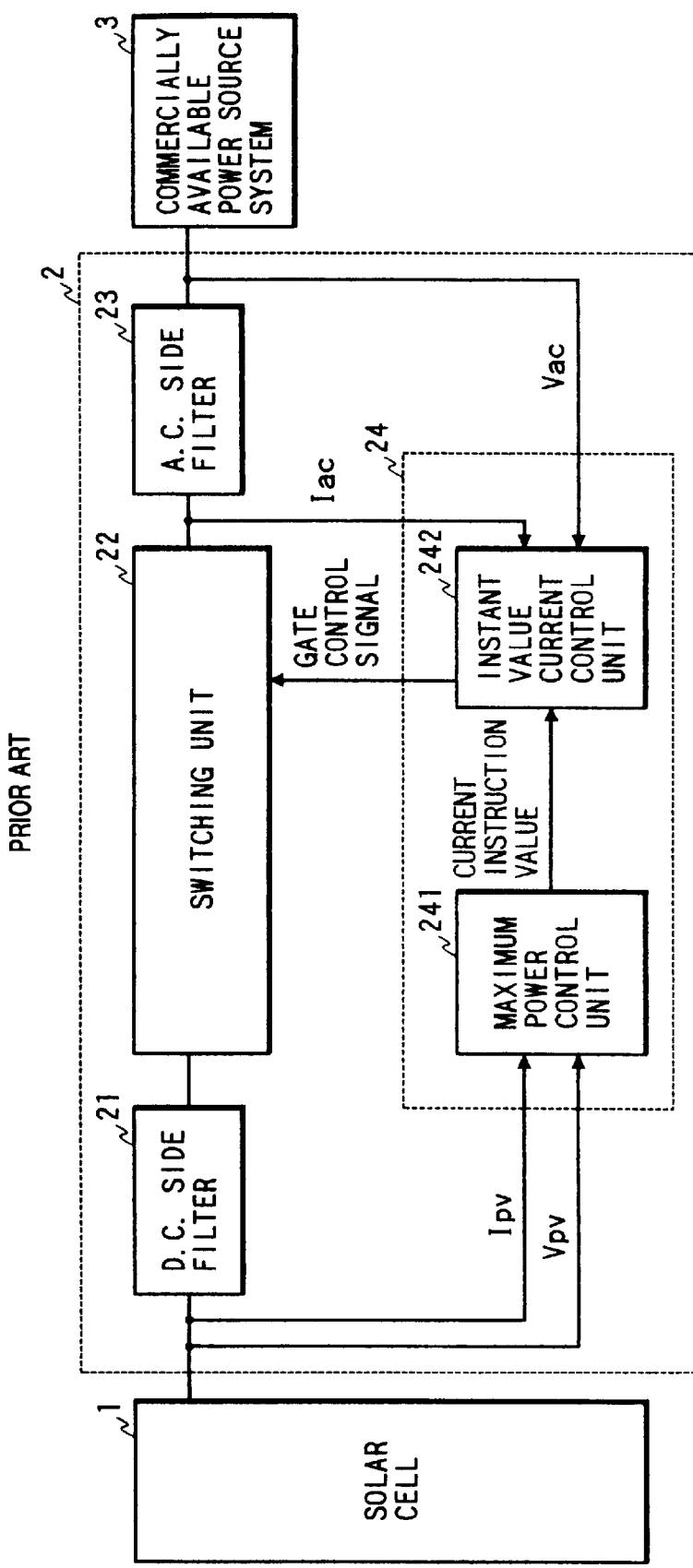
FIG. 1 is a schematic block constructional diagram for explaining a construction of a solar power generation system.

In FIG. 3, the same component elements as shown in FIG. 1 are designated by the same reference numerals. Reference numeral 4 denotes a CPU (central processing unit); 5 an inversion discrimination circuit; and 6 a converter. The converter 6 is connected to the commercially available power source system 3 and supplies a desired current value as a reference current to the inversion discrimination circuit 5. An output current from the switching unit 22 is supplied to the inversion discrimination circuit 5.

According to the inverter 2 in FIG. 3, an analog comparator and a proper main process by the CPU are combined and an all-off time to turn off all of the switches of the switching unit 22 is set. In FIG. 3, a gate driving circuit (not shown) of the switching unit 22 is directly driven by a digital output signal from the digital CPU 4. A switch inversion request signal from the inversion discrimination circuit 5 is coupled to an interruption signal line of the CPU 4.

As a solar cell 1, there is a cell such that amorphous silicon or crystal silicon is used in a photoelectric converting layer. However, there is no limitation when embodying the invention. In the embodiment, 56 (14 series×4 parallel) amorphous solar cell modules (trade name: UPM880) made by USSC Co., Ltd. are used as a solar cell 1 and an array having an output of 200V and 5.6 A is constructed.

The output of the solar cell 1 is inputted to the switching unit 22 through the DC side filter 21 having a capacitor of a large capacitance. In the embodiment, an aluminum electrolytic capacitor of 4700 $\mu$F is used as a capacitor of the DC side filter 21. As such a capacitor, it is necessary to select a capacitor such that it can withstand a ripple current and a release voltage of the solar cell 1.

As a switching unit 22, what is called a full bridge circuit using four self arc-extinguishing type switching devices such as MOSFETs, IGBTs, or the like is preferably used. As another circuit, a half bridge circuit using two devices or the like can be also used. In the embodiment, a full bridge circuit shown in FIG. 4 is constructed by using four MOSFETs (2SK1405: 600V and 15 A) made by Hitachi Ltd. The output of the switching unit 22 is connected to the commercially available power source system (100V, 60 Hz) through an output reactor (10 A, 10 mH).

As shown in FIG. 4, the four MOSFETs have two sets (221 and 222; 223 and 224) of MOSFETs in each of which a source S and a drain D are interconnected. The drains D of the MOSFETs (221 and 223), of which is source S is interconnected, are respectively connected to the positive (+) terminal. The sources S of the MOSFETs (222 and 224), of which are interconnected drains D, are respectively connected to the negative (−) terminal. Outputs are taken out from the nodes where the sources S and drains D of the MOSFETs are connected. An output from the CPU 4 is supplied to a gate G of each MOSFET.

Figure 5:
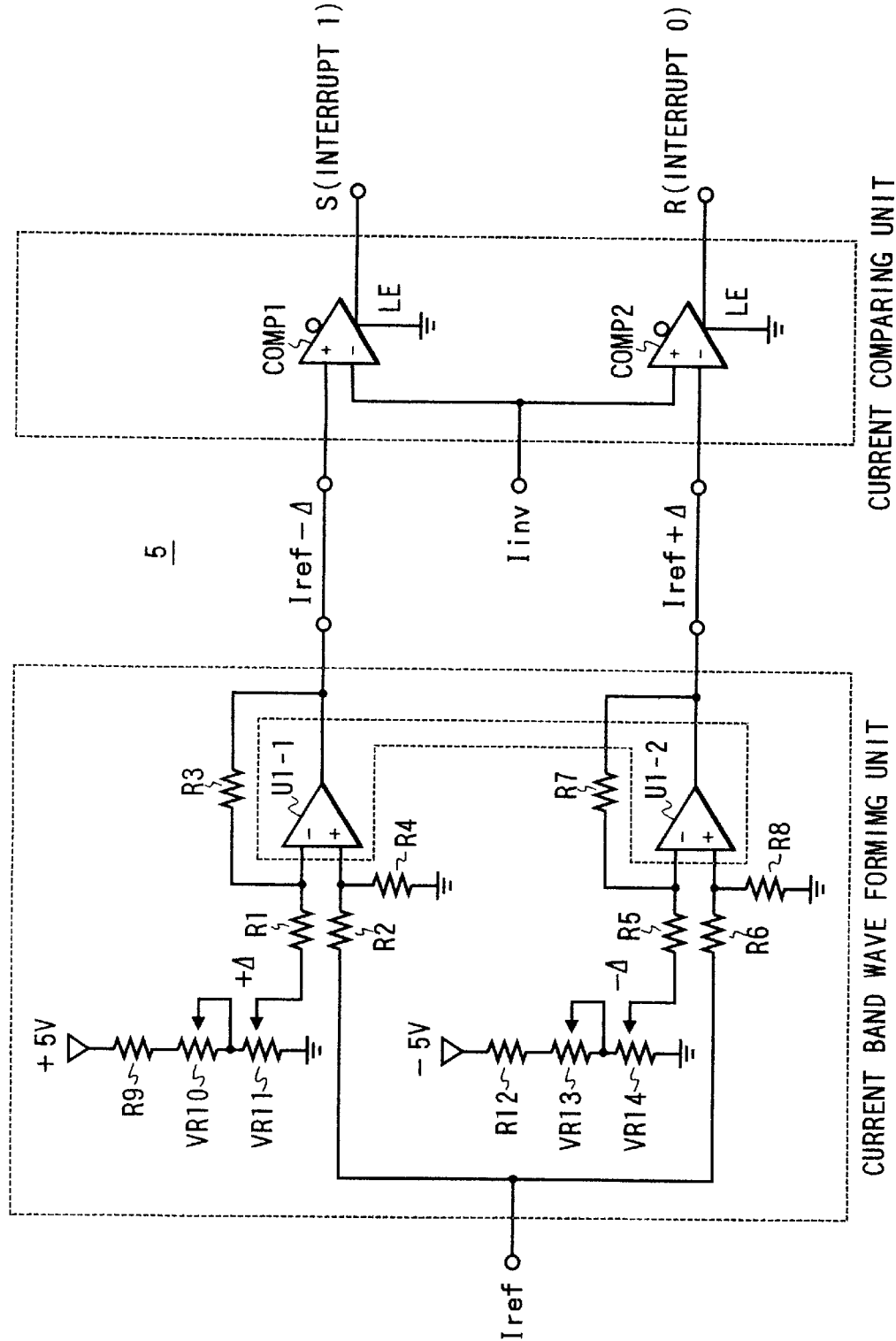
FIG. 5 is a schematic circuit constructional diagram for explaining an example of an inversion discrimination circuit.

A current trace control type is used as an instant value current control system (inversion discrimination system). FIG. 5 shows a specific example of a circuit to execute it. In the inversion discrimination circuit 5 in FIG. 5, a voltage obtained by multiplying a predetermined constant to a system voltage is applied as a reference current to a reference signal input terminal Iref. An inverter output current is supplied to an output current input terminal Iinv and is compared by comparators COMP1 and COMP2, respectively. Inversion request signals having opposite phases are outputted.

R1 to R9 and R12 denote fixed resistors and VR10, VR11, VR13, and VR14 indicate variable resistors, respectively.

Resistance values of those resistors are set as follows: R1 to R8=100 kΩ; R9, R12=5.1 kΩ; VR10, VR13=500 Ω; and VR11, VR14=200 Ω.

A state of the operation of the inversion discrimination circuit 5 will now be explained with reference to FIG. 2. When a difference between the reference current Iref and the output current Iinv is out of a predetermined current width Δ, an output occurs so that an inversion request signal R or S is set to the high logic level H. In the embodiment, general operational amplifiers TL072 are used as arithmetic operational amplifiers U1-1 and U1-2 and MAX909 made by Maxim Co., Ltd. in which an output is at the TTL level and an operating speed is high is used as a comparator. Particularly, although there is no severe limitation with respect to those devices, in order to connect to the digital CPU, it is convenient to use devices such that digital levels (CMOS, TTL) are outputted to the outputs R and S. It is necessary to set the current width Δ to a proper value in consideration of an efficiency and a distortion of the inverter. Generally, when Δ is reduced, the number of switching times increases and an efficiency deteriorates. However, a distortion decreases. When Δ is increased, the opposite phenomena occur. Therefore, it is necessary to decide the current width Δ in consideration of conditions such as a distortion and the like.

The outputs R and S of the inversion discrimination circuit 5 are connected to the interruption input terminal of the digital CPU. It is desirable to use a CPU having a plurality of interruption input terminals. Unless otherwise, it is sufficient to enable a plurality of interruption inputs to be connected by using a circuit for an interruption control as represented by an IC (model name, 8251) made by Intel Co., Ltd.

In the embodiment, a micomboard for learning (trade name; MTK7702A) made by Mitsubishi Electric Corporation is used. A device M7710 (made by Mitsubishi Electric Corporation; clock frequency is 25 MHz) is installed as a CPU on the board. Such a CPU is what is called a 1-chip type and has an A/D converter, a D/A converter, a timer, a parallel I/O, an RAM, and three interruption input terminals. The CPU is suitable for embodying the invention. In the embodiment, the outputs R and S are connected to an interruption 0 and an interruption 1, respectively. Bits 0 to 4 of a parallel port No. 6 are used as a gate pulse.

An output of the parallel port is insulated by a photocoupler and, after that, it is sent to a gate driving circuit of the switching device. A well-known circuit can be used as a gate driving circuit. In many cases, since recommended gate driving circuits are disclosed in brochures of the power devices of respective companies, they can be also used.

An inverter control apparatus according to the invention is constructed as mentioned above. A construction of a software will now be described.

In the control apparatus of the invention, it is necessary to describe two independent processing programs of a switch inversion processing routine described as an interrupting process and a main control routine for executing other processes such as an optimum operation point trace control and the like. In case of the invention, since the mutual programs don't need to be aware of their existence, the program can be fairly easily described and a maintenance performance is raised.

Figure 6:
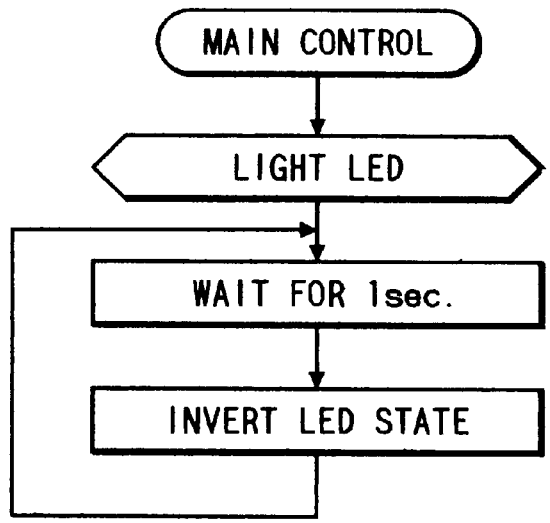
FIGS. 6 and 9 are flowcharts each for explaining an example of a main control process.

According to the embodiment, a process for flickering an LED connected to the fifth parallel port of the CPU M7710 is executed in the main control process. FIG. 6 shows such a main control process. The operation which is described by the main control routine must have a delay control (response) time slower than a switch inverting operation. Unless otherwise, a time for an interrupting process becomes an amount that cannot be relatively ignored and obstructs the operation.

Figure 7A:
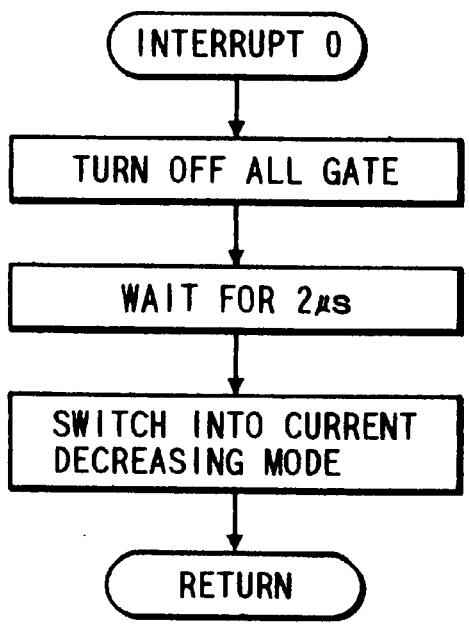
Figure 7B:
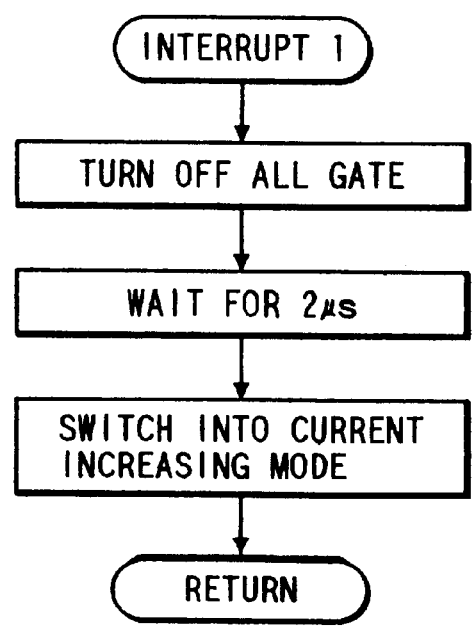

The description contents of the interruption processing routine is as shown in FIGS. 7A and 7B. The process for ALLOFF (all of the switching devices are turned off. In the embodiment, the ALLOFF process is executed for a time of 2 μseconds) is executed for a predetermined time. After that, a status inversion to a current increasing mode (the FETs 221 and 224 are turned on) and a current decreasing mode (the FETs 222 and 223 are turned on) is executed. By the ALLOFF process, it is possible to prevent an accident such that the switching devices (the FETs 221 and 222, the FETs 223 and 224 in FIG. 4) serially connected to the solar cell output are simultaneously made conductive due to a delay of the arc extinction or the like and the circuit is short-circuited and the switching devices are broken or the like. It is a feature of the embodiment that an ALLOFF time is decided in a software manner. When the kind of switching device is changed, there is a case where the ALLOFF time has to be changed. Even in such a case, the control apparatus of the embodiment doesn't need the change of hardware which requires a time and costs. Since the switching operation can be intelligently executed by the CPU, many various processes can be performed for an unexpected situation and a safety as a system can be raised.

According to the control apparatus, while executing the flickering operation of the LED after resetting, only when there is a switch inversion interruption, the switch inversion is performed and the output current waveform is controlled. In the apparatus, since the phase synchronization with the system is automatically accomplished by the reference current Iref to the inversion discrimination circuit, the control processing program is remarkably simple as mentioned above.

Embodiment 2

In the embodiment, IGBT (CM50DY-12H) made by Mitsubishi Electric Corporation is used as a switching device and the other hardware construction is substantially the same as the embodiment 1. The description of the interruption processing routine is changed as shown in FIGS. 8A and 8B. Specifically speaking, a time from the previous inversion is measured by using a timer. When the measured time is too short, a time waiting process is executed. In the embodiment, the shortest switch time is set to 0.1 msec. By performing a limiting process of the shortest switch time as mentioned above, a switching frequency can be limited to 10 kHz or less. Since the switching operation of the IGBT is slower than that of the MOSFET, it is necessary to limit the switching frequency. However, in the control apparatus of the invention, there is no need to modify the hardware in association with it. A memory for storing the time is commonly used for the interruption 0 and the interruption 1.

Embodiment 3

Figure 9:
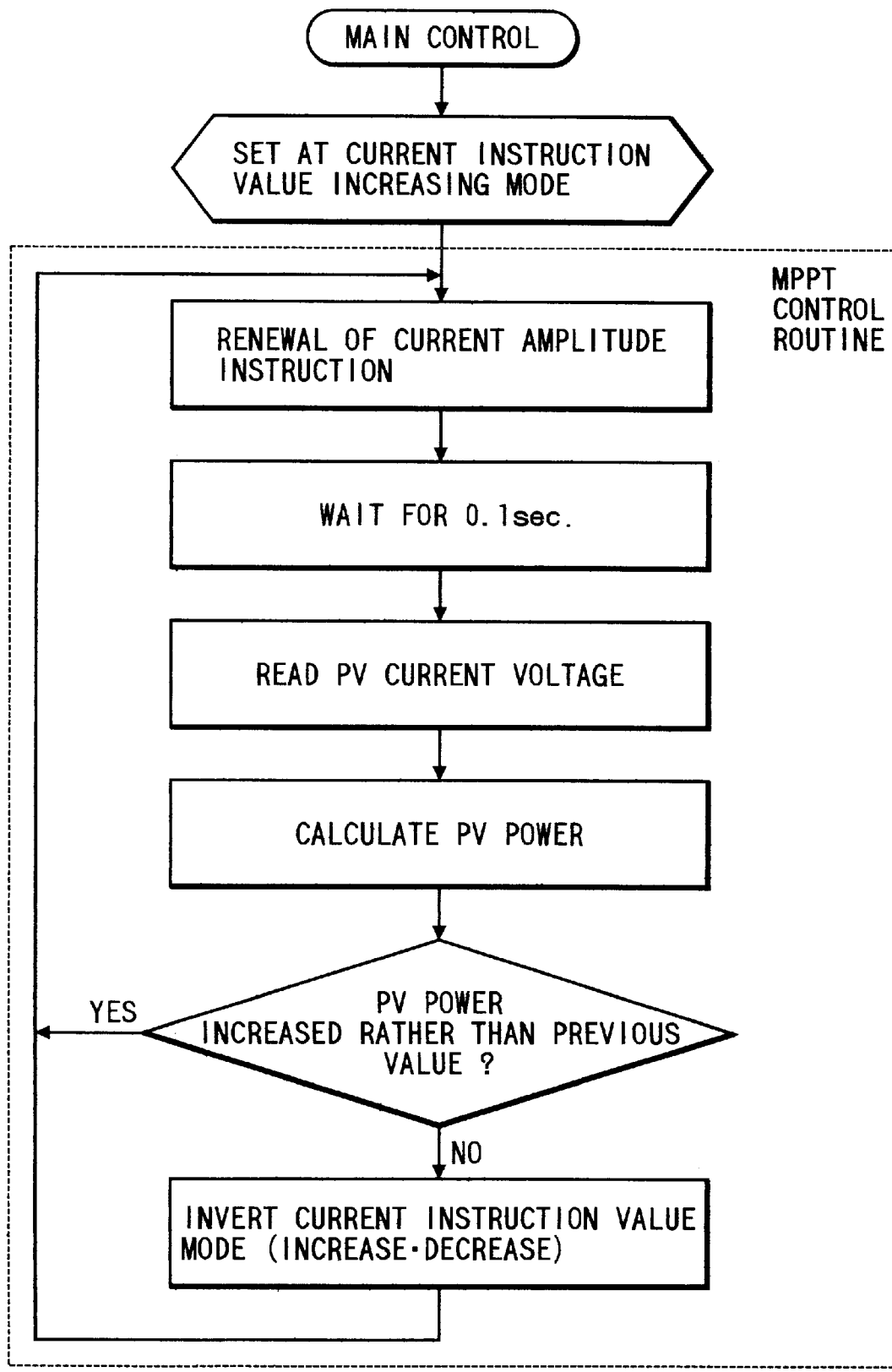

In the embodiment, in addition to the foregoing embodiments, the main control routine is rewritten as shown in FIG. 9 and the optimum operation point trace (MPPT) control operation is executed by the main control routine.

Namely, after the current instruction value increasing mode was set, a current amplitude instruction is renewed and the apparatus waits for 0.1 second. Subsequently, a PV (solar cell) current/voltage is read and a PV electric power is calculated. A check is now made to see if the PV (solar cell) electric power has increased than the previous calculation result. If YES, the current amplitude instruction is renewed. When the PV power is not increased than the previous calculation result, the current instructing mode is inverted. After that, the current amplitude instruction is renewed.

Figure 10:
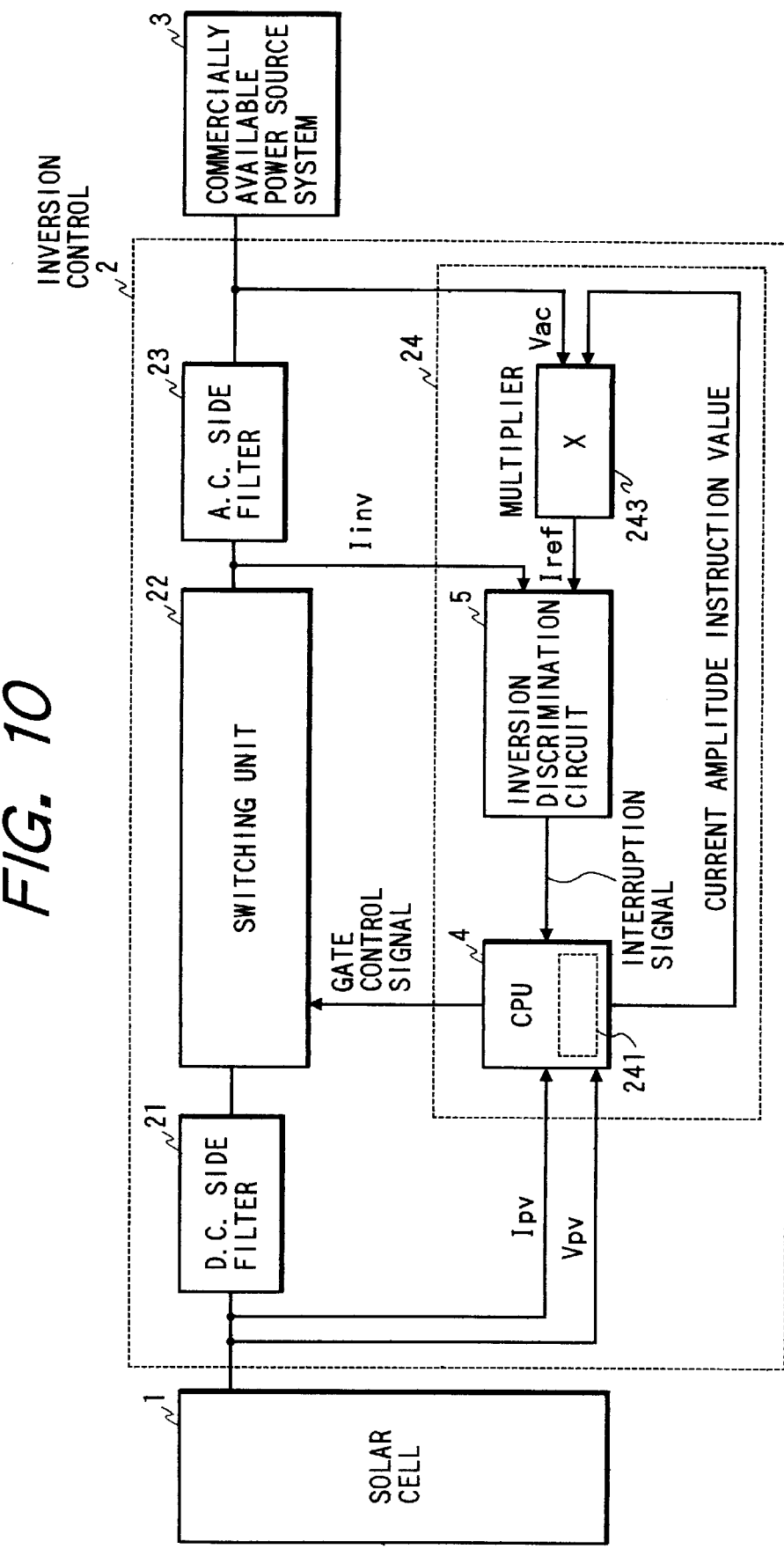

As mentioned above, the current instruction is renewed in accordance with an increase or decrease in PV power. In association with the optimum operation point trace, a circuit is constructed as shown in FIG. 10 so that the micomboard can also fetch the solar cell voltage and current to the A/D input terminal.

To fetch the solar cell voltage, it is a general way that the voltage of the solar cell is dropped by a proper voltage dividing resistor and, after that, the dropped voltage is inputted to the A/D input terminal by using an insulating amplifier. To fetch the solar cell current, after insulating, it is sufficient that the current is converted into the voltage by using a DCCT (DC current transformer) using a Hall element and the voltage is inputted to the A/D input terminal of the CPU. As other methods, there are a method of using a precise resistor for a current detection and the like. An output of a D/A converter is multiplied to the system voltage by an analog multiplier 243 and the resultant voltage is used as a reference current Iref, thereby enabling a magnitude of an inverter output current to be controlled by the CPU. The maximum power control unit 241 is assembled in the CPU 4.

There is a mountain climbing method as an MPPT control operation method. In the embodiment, the mountain climbing method is used. A portion surrounded by a broken line in FIG. 9 mentioned above shows a flowchart for the mountain climbing method. Namely, the current instruction value is increased, a PV power at that time is calculated, and when the power drops, the current instruction value is decreased and, when the power rises, the current instruction value is further increased. A waiting time of 100 msec (0.1 second) is provided for a control loop in order to allow the inverter to trace the operation. Even if there is a waiting time for limiting the switching time, a processing time of the interruption processing routine is at most 0.2 msec or less. Therefore, there is a difference of 500 times between both of the above control times.

When the apparatus is operated in a day under a blue sky as mentioned above, the inverter of the embodiment doesn't abnormally operate but execute the maximum power point tracing operation. No problem occurred with respect to an output current distortion and the shortest switching time. As mentioned above, the MPPT operation and the output waveform forming operation can be embodied by the single CPU.

Figure 11:
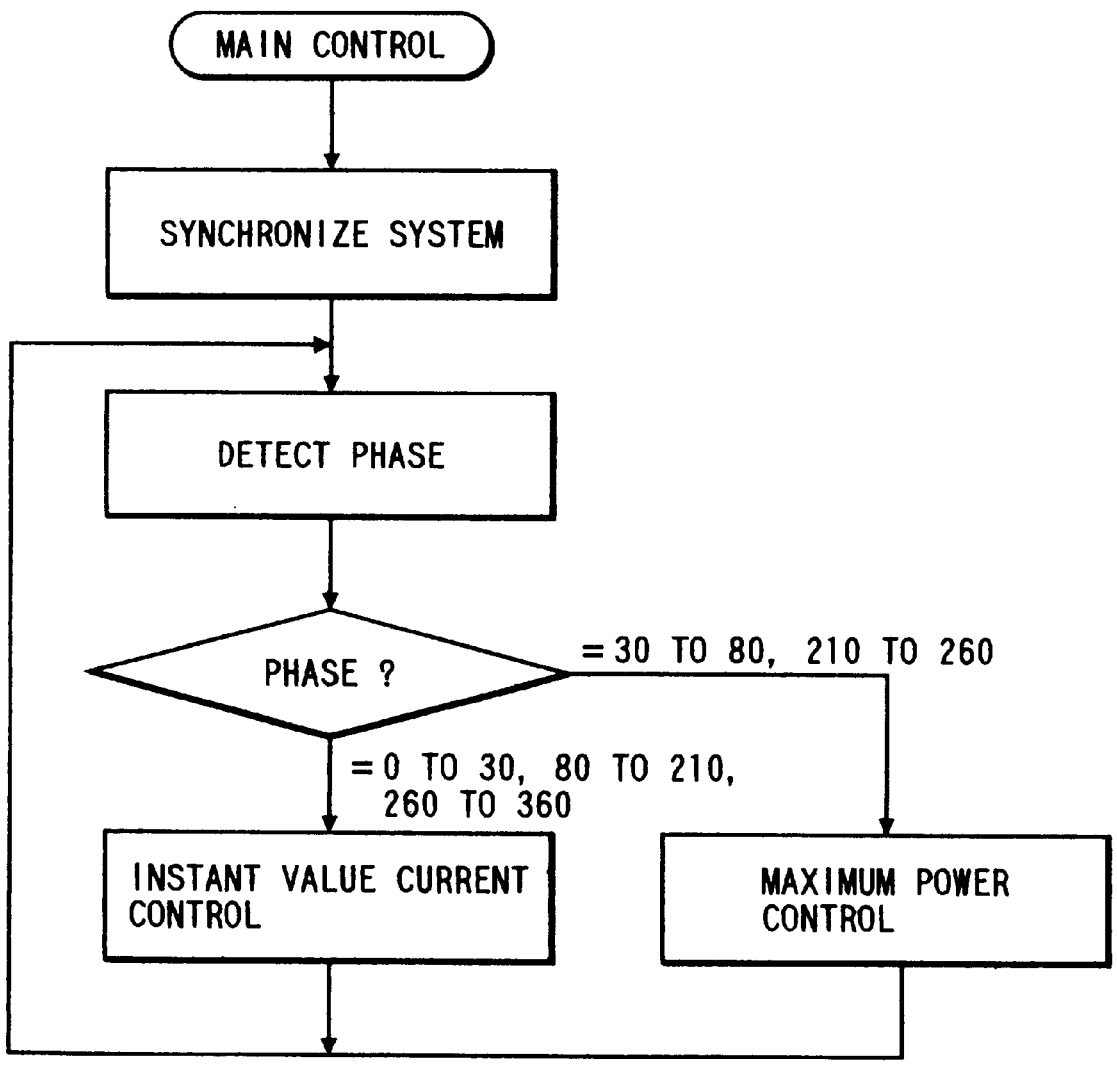
FIG. 11 is a flowchart for explaining a main control process in a comparison example.

As a comparison example, FIG. 11 shows a flowchart of an example of a program for processing the waveform formation and the main control operation by only a software. In this case, relatively complicated processes such as system synchronizing process, phase discriminating process, and the like are necessary.

As mentioned above, according to the invention, there is provided the control apparatus of the system linkage inverter for converting the DC electric power into the AC electric power by using the switching device and reversely supplying the AC electric power to the commercially available power source system, comprising: the inversion discriminating means for inputting an output current or output voltage and a reference signal and for discriminating whether a switching state of the switching device is inverted or not; and the gate pulse signal forming means for changing the switching state of the switching device in response to an inversion request signal which is outputted from the inversion discriminating means and, wherein the gate pulse signal forming means is constructed by the digital CPU and the inversion request signal is inputted as an interruption control signal of the CPU. The control apparatus has the following effects.

(1) The parameters such as ALLOFF time and shortest switching time which are peculiar to the switching device can be easily changed.

(2) The gate block function can be easily realized.

(3) The lowest or highest switching frequency can be easily limited.

(4) In the solar power generation, the MPPT control unit and the waveform control unit can be constructed by a cheap single CPU of a relatively slow speed. Thus, the costs of the inverter control apparatus can be reduced.

(5) Since the interrupting process is used, the maximum power control process and the waveform formation control (gate pulse generating) process can be described as exactly independent programs. Therefore, the debugging of each process can be also independently easily executed and a developing efficiency can be raised.

What is claimed is:

1. An inverter for converting D.C. power outputted from a solar cell into A.C. power, comprising:
   a switching circuit connected to the solar cell to turn on and off according to a gate pulse signal;
   a digital CPU for executing a processing, in a main routine that is allowed to be interrupted, a control for setting a reference value of an output current from the inverter so that the output from the solar cell reaches a maximum value; and
   an inversion discrimination circuit for comparing the reference value set by said digital CPU with the output current from the inverter to obtain a result, and outputting an inversion request signal to an interruption signal line of said digital CPU according to the result of the comparing,
   wherein said digital CPU executes processing for outputting to said switching circuit a gate pulse signal according to the inversion request signal in an interruption processing routine.

2. An inverter according to claim 1, wherein said switching circuit comprises a bridge circuit comprising self arc-extinguishing type switching devices.

3. An inverter according to claim 1, further comprising a filter connected between said solar cell and said switching circuit.

4. An inverter according to claim 1, further comprising a filter for filtering an output from said switching circuit.

5. An inverter according to claim 1, further comprising a converter connected to an output side of said inverter and supplying the output current value of said inverter to said inversion discrimination circuit.

6. An inverter according to claim 1, wherein an output side of said inverter is connected to a commercial power system.

7. A solar power generation system comprising:
   a solar cell; and
   an inverter for converting D.C. power outputted from said solar cell into A.C. power, said inverter comprising:
   a switching circuit connected to the solar cell to turn on and off according to a gate pulse signal;
   a digital CPU for executing a processing, in a main routine that is allowed to be interrupted, a control for setting a reference value of an output current from the inverter so that the output from the solar cell reaches a maximum value; and
   an inversion discrimination circuit for comparing the reference value set by said digital CPU with the output current from the inverter to obtain a result, and outputting an inversion request signal to an interruption signal line of said digital CPU according to the result of the comparing,
   wherein said digital CPU executes processing for outputting to said switching circuit a gate pulse signal according to the inversion request signal in an interruption processing routine.

* * * * *

UNITED STATES PATENT AND TRADEMARK OFFICE
CERTIFICATE OF CORRECTION

PATENT NO. : 6,031,736
DATED : February 29, 2000
INVENTOR(S) : Nobuyoshi Takehara et al.

It is certified that error appears in the above-identified patent and that said Letters Patent is hereby corrected as shown below:

Title page,
Item [56] References Cited:

U.S. PATENT DOCUMENTS,
Insert -- 5,121,043    6/1992  Kerkman et al.
         5,404,089    4/1995  Flanagan et al. --; and FOREIGN PATENT DOCUMENTS,
Insert -- 432881 A1    6/1991  European Pat. Off. -- and
"8126344" should read -- 8-126344 --.

Column 1,
Line 16, "an" should be deleted.

Signed and Sealed this

Twenty-eighth Day of August, 2001

Attest:

NICHOLAS P. GODICI
*Attesting Officer*    *Acting Director of the United States Patent and Trademark Office*